(12) United States Patent
Nichols (10) Patent No.: US 6,294,917 B1
(45) Date of Patent: Sep. 25, 2001

(54) ELECTROMAGNETIC INDUCTION METHOD AND APPARATUS FOR THE MEASUREMENT OF THE ELECTRICAL RESISTIVITY OF GEOLOGIC FORMATIONS SURROUNDING BOREHOLES CASED WITH A CONDUCTIVE LINER

(75) Inventor: Edward Nichols, Berkeley, CA (US)

(73) Assignee: Electromagnetic Instruments, Inc., Richmond, CA (US)

( * ) Notice: Subject to any disclaimer, the term of this patent is extended or adjusted under 35 U.S.C. 154(b) by 0 days.

(21) Appl. No.: 09/394,852

(22) Filed: Sep. 13, 1999

(51) Int. Cl.[7] ................. G01V 3/10; G01V 3/26
(52) U.S. Cl. ................. 324/339; 324/346; 702/11
(58) Field of Search ................. 345/134; 324/338, 324/339, 346, 332; 702/11, 10, 7, 6

(56) References Cited

U.S. PATENT DOCUMENTS

| | | | |
|---|---|---|---|
| 4,748,415 | 5/1988 | Vail | 324/339 |
| 4,901,023 | 2/1990 | Vail | 324/339 |
| 4,903,207 | 2/1990 | Alger et al. | 364/422 |
| 5,018,590 | 5/1991 | Weldon | 175/105 |
| 5,038,107 | 8/1991 | Gianzero et al. | 324/339 |
| 5,065,100 | 11/1991 | Vail | 324/339 |
| 5,130,655 | 7/1992 | Conti | 324/258 |
| 5,157,392 | 10/1992 | Zimmer | 340/853.9 |
| 5,260,661 | 11/1993 | Vail | 324/339 |
| 5,283,520 | 2/1994 | Martin | 324/339 |
| 5,426,367 | 6/1995 | Martin | 324/339 |
| 5,586,082 | 12/1996 | Anderson et al. | 367/73 |
| 5,621,169 | 4/1997 | Harris et al. | 73/152.18 |
| 5,646,533 | 7/1997 | Locatelli et al. | 324/339 |
| 5,654,639 | 8/1997 | Locatelli et al. | 324/339 |
| 5,892,362 | 4/1999 | Warren et al. | |

OTHER PUBLICATIONS

Uchida, Toshihiro et al., *Effect of a steel casing on crosshole EM measurement*, 61st Annual International SEG Meeting, Expanded Abstracts with Biographies, vol. 1, pp. 442–445 (Nov. 10–14, Houston, Texas, 1991).

Wilt, Michael et al., *Crosshole electromagnetic tomography: A new technology for oil field characterization*, The Leading Edge, pp. 173–177 (Mar. 1995).

Wilt, M.J. et al., *Crosswell electromagnetic tomography: System design consideration and field results*: Geophysics, vol. 60(3), pp. 871–885 (May–Jun. 1995).

Wu, Xu et al., *Influence of steel casings on electromagnetic signals*: Geophysics, vol. 59(3), pp. 378–390 (Mar. 1994).

Augustin, A.M. et al., *A theoretical study of surface–to–borehole electromagnetic logging in cased holes*: Geophysics, vol. 54(1), pp. 90–99 (Jan. 1989).

Wilt, Michael et al., *Electromagnetic methods for development and production: State of the art*, The Leading Edge, pp. 487–490 (Apr. 1998).

*Primary Examiner*—Safet Metjahic
*Assistant Examiner*—Anthony Jolly
(74) *Attorney, Agent, or Firm*—John J. Ryberg; Victor H. Segura (57) ABSTRACT

Provided is a technique, including a method and a computer program product, to dynamically measure characteristics of geologic formations while hydrocarbons are being extracted therefrom. Specifically, the present invention allows measuring the resistivity of geologic formations in which a borehole has been formed therein and encased with a conductive casing, such as a conductive liner. This has been achieved by providing a method and computer program product that compensates for the effects of a conductive liner by measuring the characteristics of the geologic formation as a function of a ratio of two magnetic fields sensed by a receiver disposed in one of the boreholes.

33 Claims, 7 Drawing Sheets

ELECTROMAGNETIC INDUCTION METHOD AND APPARATUS FOR THE MEASUREMENT OF THE ELECTRICAL RESISTIVITY OF GEOLOGIC FORMATIONS SURROUNDING BOREHOLES CASED WITH A CONDUCTIVE LINER

BACKGROUND OF THE INVENTION

Geologic formations forming a reservoir for the accumulation of hydrocarbons in the subsurface of the earth contain a network of interconnected paths in which fluids are disposed that may ingress or egress from the reservoir. To determine the behavior of the fluids in the aforementioned network, knowledge of both the porosity and permeability of the geologic formations is desired. From this information, efficient development and management of hydrocarbon reservoirs may be achieved. For example, the resistivity of geologic formations is a function of both porosity and permeability. Considering that hydrocarbons are electrically insulative and most formation water contains salts, resistivity measurements are a valuable tool to determine the presence of hydrocarbon reservoirs in geologic formations and to monitor the changes in hydrocarbon content as production of the hydrocarbon proceeds.

To that end, there have been many prior art attempts to determine the electrical resistivity of geologic formations surrounding and between drill holes. In two articles, *Crosshole electromagnetic tomography: A new technology for oil field characterization*, The Leading Edge, March 1995, by Wilt et al. and *Crosshole electromagnetic tomography: System design considerations and field results*, Society of Exploration Geophysics, Vol. 60, No. 3, 1995 by Wilt et al., measurement of geologic formation resistivity is described employing a low frequency electromagnetic (em) system.

Figure 1:
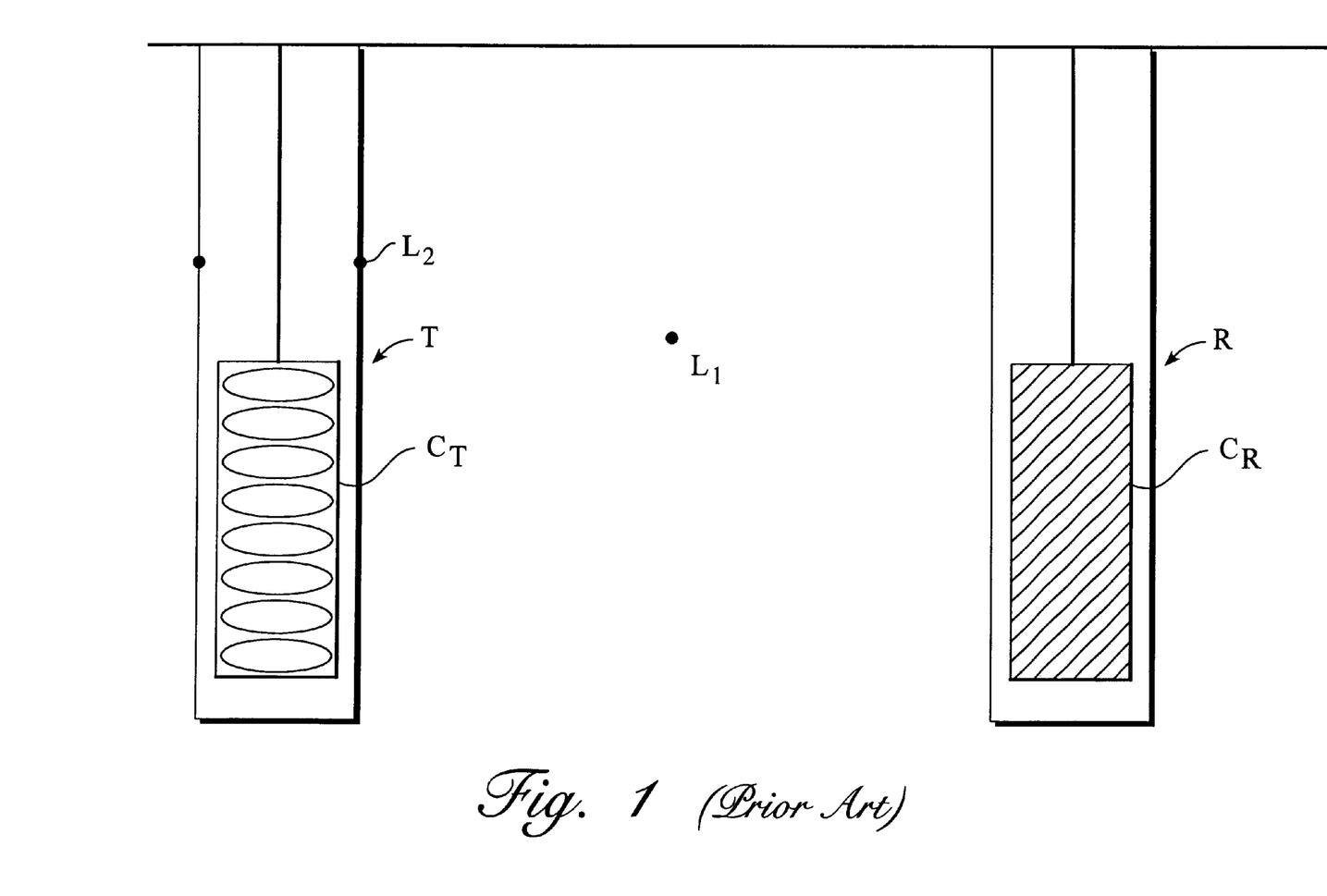
FIG. 1 is a simplified plan view of a prior art cross-well electromagnetic measurement system.

FIG. 1 shows the configuration of equipment used in the measurement of geologic formation resistivity between two drill holes. A transmitter, T, is located in one borehole and consists of a coil $C_T$ having multi-turn horizontal loop (vertical solenoid) of $N_T$ turns, having an effective cross section $A_T$. The multi-turn horizontal loop carries an alternating current, $I_T$, at a frequency of $f_0$Hz. In free space this multi-turn horizontal loop produces a time varying magnetic field, $B_0$. The magnetic field, $B_0$, is proportional to the magnetic moment of the transmitter, $M_T$, and to a geometric factor, $k_1$. The magnetic moment of the transmitter $M_T$ is defined as follows:

$$M_T = N_T I_T A_T \quad (1)$$

The geometric factor, $K_1$, is a function of a spatial location and orientation of a field component of the magnetic field, $B_0$, measured by a receiver, R, with respect to the magnetic moment of the transmitter, $M_T$. The receiver is located spaced-apart from the transmitter, T, and typically disposed in a borehole in the earth. In free space, therefore, the magnetic field, $B_0$, is defined as follows:

$$B_0 = k_1 M_T \quad (2)$$

The receiver, R, typically includes a multi-turn loop of wire, i.e., a coil, $C_R$, having $N_R$ turns of wire, wound about a core of high permeability metal or ferrite. The changing magnetic field $B_R$ sensed by the receiver, R, with frequency $f_0$, creates an induced voltage $V_R$ in the coil which is proportional to, $B_R$; the frequency, $f_0$; the number of turns of wire, $N_R$; the effective cross-sectional area of the coil, $A_R$; and the effective permeability, $\mu_R$, of the coil $C_R$. From the foregoing, it is shown that $V_R$ is defined as follows:

$$V_R = f_0 B_R N_R A \mu_R \quad (3)$$

Simplifying equation (3) above, $V_R$ may be written as follows:

$$V_R = k_R B_R \quad (4)$$

where $k_R = f_0 N_R A_R \mu_R$. The product of $A_R \mu_R$ is difficult to calculate. To accurately determine $A_R \mu_R$, CR is calibrated in a known field, at a known frequency to find an exact value for $k_R$. Thereafter, the magnetic field, $B_R$, sensed by the receiver, R, is related directly to the measured voltage $V_R$ by the following:

$$B_R = V_R / k_R \quad (5)$$

When this system is placed in a conducting geologic formation the time varying magnetic field, $B_0$, produces an electromotive force in the geologic formation, which in turn drives currents therein, shown schematically as $L_1$. The currents, $L_1$, are proportional to the conductivity of the geologic formation and are concentric about the longitudinal axis of the borehole. The magnetic field proximate to the borehole is a result of the free space field, $B_0$, called the primary magnetic field, and the field from the current $L_1$, called the secondary magnetic field.

The current $L_1$ is typically out of phase with respect to the transmitter current $I_T$. At very low frequencies, where the inductive reactance of the surrounding formation is small, the induced current $L_1$, is proportional to dB/dt and is consequently 90° out of phase with respect to $I_T$. As the frequency increases, the inductive reactance increases and the phase increases to be greater than 90°.

The secondary magnetic field at the receiver, R, is caused by the induced current and consequently also has a phase shift and so the total field is complex. The total measured field has a component, $B_R$, in-phase with the transmitter current $I_T$, (called the real component) and a component, $B_I$, phase shifted by 90° (called the imaginary or quadrature component). The values of the real, $B_R$, and quadrature components, $B_I$, of the magnetic field at a given frequency and geometrical configuration uniquely specify the electrical resistivity of a homogenous formation pierced by the drill holes. In an inhomogeneous geologic formation, the complex field is measured at a succession of points along the longitudinal axis of the receiver borehole for each of a succession of transmitter locations. The multiplicity of T-R locations suffices to determine the inhomogeneous resistivity between the holes as described in the papers above.

In general, the inhomogeneous distribution of electrical resistivity is determined through a process called inversion which is well described by *Audio-frequency electromagnetic tomography in 2-D*, Geophysics, Vol. 58, No. 4, 1993 by Zhou et al., Electromagnetic conductivity imaging with an iterative born inversion, IEEE Transactions on Geoscience and Remote Sensing, Vol. 31, No. 4, 1993 by Alumbaugh et al., *An approach to nonlinear inversion with applications to cross-well EM tomography*, 63rd Annual International Meeting, Society of Exploration Geophysics, Expanded Abstracts, 1993 by Torres-Verdin et al., and *Crosswell electromagnetic inversion using integral and differential equations*, Geophysics, Vol. 60, No. 3, 1995 by Newman. This process has been well demonstrated for the determination of resistivity in the vicinity of a single well or between spaced apart wells and is described in detail by *Crosswell electromagnetic tomography: System design con-*

*siderations and field results*, Geophysics, Vol. 60, No. 3, 1995 by Wilt et al., *Theoretical and practical considerations for crosswell electromagnetic tomography assuming a cylindrical geometry*, Geophysics, Vol. 60, No. 3, by Alumbaugh and Wilt, and *3D EM imaging from a single borehole: a numerical feasibility study*, 1998 by Alumbaugh and Wilt.

In brief, one embodiment of the inversion process consists in assigning resistivities to a multitude of cells or elements of the volume surrounding or between wells and systematically varying these resistivities until, in a least squares sense, the results from the cellular model of the formation match the observed data taken with the field transmitter receiver system described herein. In another embodiment a more specific model of the formation is assumed using geological, well log or other geophysical data and the parameters of this model (e.g. resistivity distribution, shape, layer thickness, etc.) are varied until, again in a least squares sense, the numerical results from the model match the field results. In another embodiment direct images of the distribution of resistivity may be obtained following the principles of diffusion tomography as described by *Audio-frequency electromagnetic tomography in 2-D*, Geophysics, Vol. 58, No. 4, 1993 by Zhou et al. In yet another method multifrequency em data is transformed to a mathematically defined wave field domain and the data are processed following the procedures of seismic tomography. These means of interpreting the em data are included here to illustrate the fact that em methods are of practical use in determining the resistivity of geological formations.

The measurements are typically made before extraction of hydrocarbons takes place and during the extraction process. To that end, the system of FIG. 1 is principally directed to detecting hydrocarbon reservoirs and to monitoring the changes in reservoir resistivity as hydrocarbon is withdrawn. The boreholes are typically cased with conductive liners (also called casings) in order to preserve the physical integrity of the borehole during subsequent hydrocarbon extraction. A problem exists, however, in that the conductive liners are electrically conductive and are themselves inhomogeneous and strongly attenuate the ac magnetic field introduced into the formation. They cannot be removed from the borehole once installed. As a result, the system shown above in FIG. 1 does not facilitate analysis of a hydrocarbon reservoir once conductive liners are installed and extraction of the hydrocarbons begins.

The problems presented by conductive liners are described by Augustin et al., in *A Theoretical Study of Surface-To-Borehole Electromagnetic Logging in Cased Holes*, Geophysics Vol. 54, No. 1 (1989); Uchida et al., in *Effect of A Steel Casing on Crosshole EM Measurements*, SEG Annual Meeting, Texas (1991); and Wu et al. in *Influence of Steel Casing on Electromagnetic Sigals*, Geophysics, Vol. 59, No. 3 (1994). From these papers, it is seen that the conductivity may be modeled as an additional shorted wire closely coupled to the transmitter T, shown schematically as $L_2$ in FIG. 1.

The net or effective magnetic moment, $M_{eff}$, of the transmitter, T, conductive liner combination is dictated by the inductive coupling therebetween. Physically, the resistivity of the conductive liner is very low and the inductance relatively high. This results in a current being induced in the conductive liner that is approximately 180° out of phase of the transmitter current $I_T$, i.e., the induced current is of opposite polarity to the transmitter current, $I_T$, but almost of the same moment. In this manner, the magnetic field external to the conductive liner is greatly reduced. In effect, the conductive liner "shields" the transmitter, T, from the receiver, R, positioned outside of the conductive liner. The external field is produced by the difference in current, and hence moment, in the transmitter and conductive liner.

Since the induced moment in the liner is large, and nearly equal to the transmitter moment, small changes in the properties of the liner produce large fractional changes in the net of effective moment. In practice, liners are known to be inhomogeneous; there are variations in liner radius, thickness, permeability, and conductivity caused either by manufacturing/processing procedures or by corrosion/stress/temperature processes after installation. The central problems for the em methods described above for non cased, or open, well surveys is that the fields from the transmitter are severely attenuated in a cased well and that the net moment is highly variable as the transmitter traverses the length of the well. Without knowing the casing properties very precisely, it is difficult to distinguish between external field variations caused by the liner and the formation.

An analogous situation affects a magnetic field sensor within a cased borehole. The field to be detected induces currents concentric with the receiver coil whose sense is such as to reduce the field within the liner. The field to be detected is consequently highly attenuated and the measurement is highly influenced by the variations in attenuation caused by the variation in liner properties.

Various prior art has been developed to compensate for these liner effects. The fundamental problem is that the corrections, etc. have to be so accurate that a practical measurement system has yet been developed.

What is needed, therefore, is a measurement technique that provides accurate information concerning a geologic formation under analysis independent of the characteristics of a liner present.

SUMMARY OF THE INVENTION

Provided is a technique, including a method and a computer program product, to measure characteristics of geologic formations from within a cased well, or between two wells either or both of which may be cased. Specifically, the present invention allows measuring the resistivity of geologic formations in which a borehole has been formed and encased with a conductive liner, such as a steel casing. This has been achieved by providing a method and computer program product that attenuates, if not removes, the effects of the conductive liner by taking appropriate ratios of measured fields, inside and outside of the liner, in such a way that the unknown casing attenuation is canceled in the ratio. The fundamental physical fact underlying the present invention is the discovery that for the practical scale of a field survey, and for the resistivities encountered in typical petroleum reservoir formations (0.5 to 100's of ohm meters), the electromagnetic coupling between the transmitter T and the casing C, is independent of the resistivity of the surrounding formation. This discovery means that the effective moment depends only on the casing and generated transmitter moment. It also means that the fields outside the casing are similar, if not identical, in spatial distribution and orientation to the fields of the transmitter alone but reduced in amplitude by the casing attenuation factor.

The results in the field produced at a point outside of a casing from a transmitter within the casing being a function of the product of term for the attenuation of the casing, $k_e$ and a term for the response of the formation, f. Both terms are independent of the other. This in turn means that if two measurements are made at separated positions outside the casing from the same transmitter inside the casing then the ratio of the two measurements depends only on the formation since the common casing attenuation term $k_e$ cancels in the ratio. Similarly the same principle shows that the receiver could be in the cased well and the transmitter outside. Further double ratio scheme eliminates the casing effect if both wells are cased, or if transmitters and receivers are in one cased well, or finally if the transmitters and receivers are on the surface with transmitters or receivers in the well.

To that end the invention herein includes a system having a transmitter disposed within a first region of the geologic formation, and a signal generator is in data communication with the transmitter. A receiver is disposed in a first area of the formation and a processor is in data communication with the receiver. With this system, a method for determining the electrical resistivity of the formation is practiced that includes inducing within the first area of the formation currents which in turn produce first and second magnetic fields at points separated within the first area. The resistivity is then obtained from the ratio of the first and second magnetic fields. The magnetic field produced in the first area results from the totality of currents induced therein. These currents are controlled by the distribution of resistivity and the resulting magnetic fields consequently vary spatially. Typically the magnetic field is measured at one point in the first area, and a plurality of additional magnetic fields are measured in a second area spaced apart from said first area at differing distances. A ratio of the first magnetic field and each additional magnetic field is determined, producing a plurality of ratios; and the resistivity distribution of the geologic formation is determined as a function of the plurality of ratios using the inversion methods described above.

These and other embodiments of the present invention along with many of its advantages and features are described in more detail in conjunction with the text below and attached figures.

DESCRIPTION OF THE SPECIFIC EMBODIMENTS

Figure 2:
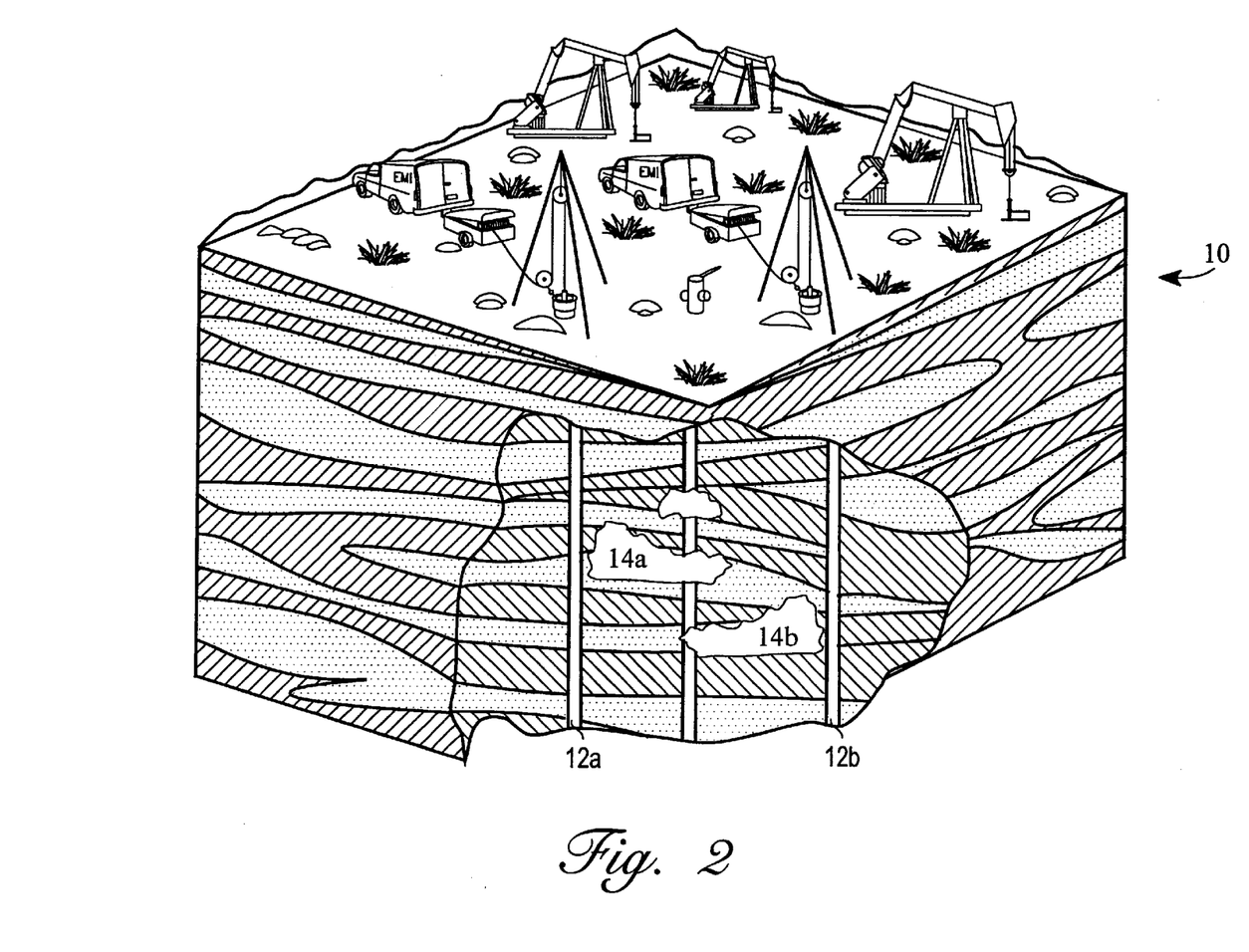
FIG. 2 is a perspective view of a geologic formation undergoing crosswell electromagnetic analysis.

Referring to FIG. 2, a geologic formation 10 under analysis includes one or more boreholes, shown generally as 12a and 12b and a reservoir of resources of interests, in this example one or more reservoirs of hydrocarbons, shown generally as 14a and 14b. Typically, at least one of the boreholes 12a and 12b is cased with a conductive liner 16a and 16b, shown more clearly in FIG. 3. A system 19 employed to analyze the geologic formation includes a transmitter 20 disposed within borehole 12a, a first region of the geologic formation. In signal communication with the transmitter 20 is a signal generator included in surface station 22. A receiver 24 is disposed in the borehole 12b. The transmitter 20 and receiver 24 are deployed using standard seven conductor wireline winches, cables and standard seven- pin Gerhardt-Owens cable connectors, shown generally as 26. The system 19 is operated using a computer (not shown), included in surface station 28, that is in data communication with the transmitter 20 and receiver 24. The computer (not shown) includes a processor (not shown) and memory (not shown) that stores programs necessary to operate the system 19.

Figure 4:
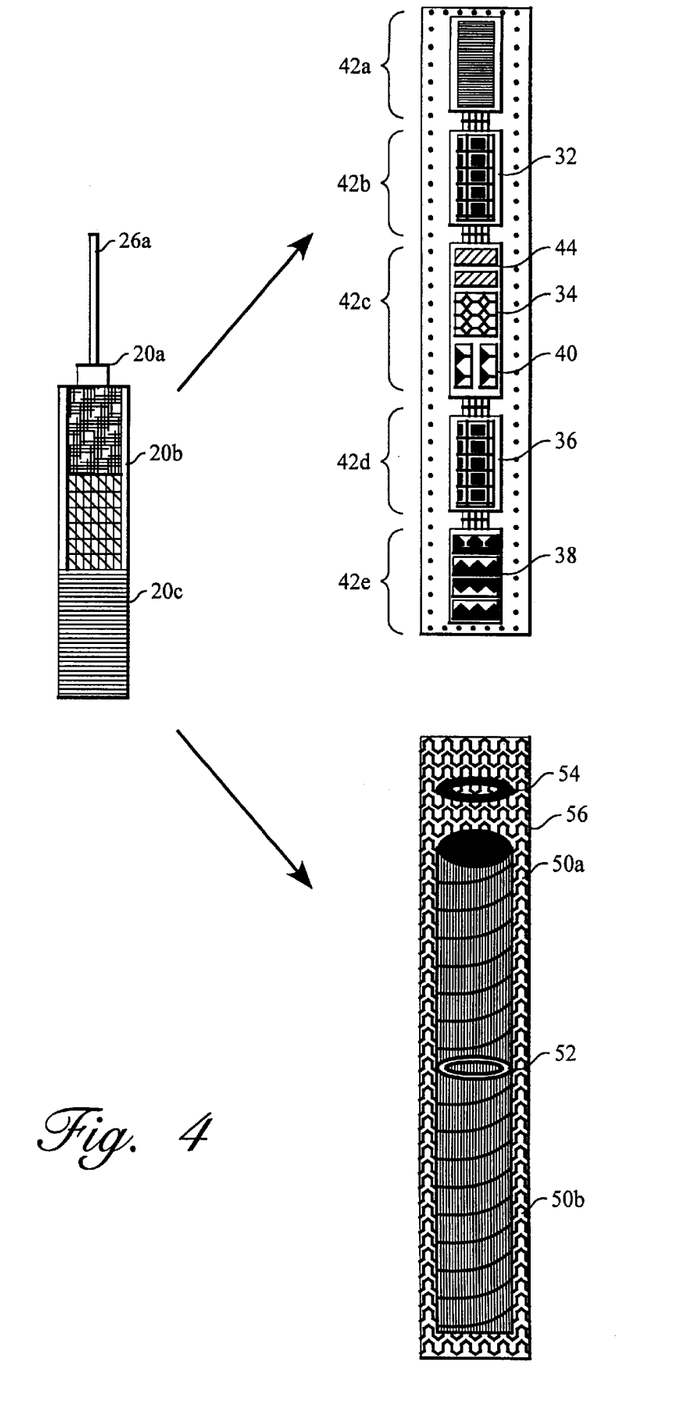
FIG. 4 is a detailed plan view of a transmitter shown above in FIG. 3.

Referring to FIG. 4, the transmitter 20 includes a tool head 20a, electronics section 20b and antenna assembly 20c. It is preferred that the tool head 20a, electronics section 20b and antenna assembly 20c should be connected in such a way as to facilitate quick disassembly and assembly. The tool head 20a is a mechanical assembly that connects the transmitter 20 to a logging cable 28 that is part of the wireline winches and cables 26. This tool head 20a section also serves to house a power regulator (not shown) and act as a heat sink for the electronics section 20b.

The electronics section 20b regulates the power, as well as generates and tunes a signal for the antenna assembly 20c. The electronics section also monitors the output from the antenna assembly 20c and sends data to the processor 28. To those ends, the electronics section 20b includes a power supply/voltage regulator 32, a borehole processing system 34, a current driver circuit 36 and tuning capacitors 38 are in electrical communication with the current driver circuit 36. To facilitate communication between the borehole processing system 34 and the driver circuit 36, an analog-to-digital converter 40, placing the same in data communication. The power supply is in electrical communication with the borehole processing system 34, the driver circuit 36 and the analog-to-digital converter 40 and typically receives an input voltage from a surface-based dc power supply.

The borehole processing system is the operational center in the transmitter 20 that controls the operation of the same to collect data from an array of sensors included in communication circuitry 44, which is in data communication with the borehole processing system 34. The sensors (not shown) include a magnetic flux sensor, casing monitor sensor, and various temperature sensors. The borehole processing system 34 typically includes a 80386 processor and associated memory and bus architecture. The communication circuitry 44 includes a modem, a phase lock loop (PLL) circuit and a gate array for timing synchronization with the receiver tool 24, as well as a relay control circuit for frequency selection and switching between tuning capacitors. In particular, the borehole processing system 34 and the communication circuitry 44 together allow frequency selection, selection of tuning capacitors, control of timing between transmitter 20 and receiver 24, setting of averaging parameters, collection and averaging of flux and casing monitoring coil data, and control of modems to communicate with the processor.

The driver circuit 36 develops a current signal to drive the antenna 20c at frequencies specified by the borehole processing system 34. In this fashion, the driver circuit 36 operates as a power supply switch, used to develop square wave signals at specified frequencies. This is achieved by alternating between positive and negative power supply voltages, making the driver circuit 36 an extremely efficient signal generator. Less than one percent of generated power is lost to heat. At low frequencies, where the antenna 20c untuned, the broadcast signal is a square wave. At frequencies of 90 Hz and higher, where the transmitter antenna 20c is tuned with capacitors, the broadcast signal is sinusoidal as a result of the resonantly tuned circuit. The driver circuit 36 develops a signal having a maximum power of 3.0 amps. Although higher current levels are possible with the driver circuit 36, it is preferred to operate at low current levels.

The tuning capacitors 38 comprise of an array of capacitors that resonantly tune the antenna section 20c to achieve maximum output at a desired frequency. The tuning capacitors facilitate compensating for the large inductance of the antenna section 20c. Specifically, the tuning capacitors 38 resonantly tune the antenna section 20c at a desired frequency to effectively cancel the impedance due to inductance as follows:

$$F_c = 1/\sqrt{LC} \quad (6)$$

Where $F_c$ is the tuning frequency, L is inductance of the antenna section 20c, and C is the capacitance of the tuning capacitors 38. The system 19 has ten operational frequencies. The upper five of these use the capacitors 38 for tuning, while the lower five frequencies are employed in an untuned condition. The capacitors of the array and coil windings are switched in and out of the circuit using a series of relays controlled by a circuit in the borehole processing system 34.

The antenna section 20c includes a two meter long and three centimeters in diameter inner section (core) of laminated mu-metal strips packed within a fiberglass tube and sealed with high temperature epoxy. The tube is then wrapped with a primary winding that includes approximately 1060 turns of wire. In addition to the primary winding 50a and 50b, the antenna section 20c has a secondary winding 52 disposed between the two of the 530 turn segments 50a and 50b and an additional winding 54 to monitor the transmitter 20's magnetic output or flux. This auxiliary receiver is useful to monitor the response of the collars at each end of a casing segment which aids in the accurate repositioning of the system in repeat measurement (monitoring) applications. This casing measurement system is also useful for corroborating the casing properties that can be deduced from the ratio method described above. The antenna section 20c is housed in an outer tube of epoxy composite material (polymide) 56. This tube is filled with oil and equipped with a pressure driven piston, mounted on the base thereof to compensate for the external pressure.

Preferably, the electronics section 20b is divided into five modules 42a, 42b, 42c, 42d and 42e, each of which is packaged within a separate container. The power supply 32 is disposed in module 42b, the analog-to-digital converter and borehole CPU 34 is disposed in module 42c, the current driver circuit 36 is disposed in module 42d and the tuning capacitors are disposed in module 42e. Positioned between the tool head 20a and the module 42b is module 42a which includes a spring loaded mechanical device to provide strength and rigidity to the electronics assembly 20c.

As shown below in Table I, the transmitter 20 provides a large magnetic moment which is largest at low frequencies where the inductive reactance of the transmitter antenna section 20c is small. This reactance increases with frequency and the transmitter 20 should be tuned using the tuning capacitors 38 to maintain a high level output. At frequencies of 90 Hz and above, where the source is tuned, the output is somewhat reduced from the low frequency. Finally, it is seen from Table I that the transmitter 20 is designed to be most powerful at frequencies below 370 Hz in order to provide sufficient signal when operating in steel-cased boreholes.

TABLE 1

| Frequency (Hz) | Transmitter Max Moment | Receiver Hz noise (nT) | Receiver Hx noise (nT) |
|---|---|---|---|
| 1 | 3000 | $30 \times 10^{-6}$ | $80 \times 10^{-6}$ |
| 5 | 3000 | $25 \times 10^{-6}$ | $60 \times 10^{-6}$ |
| 10 | 3000 | $15 \times 10^{-6}$ | $50 \times 10^{-6}$ |
| 24 | 3000 | $12 \times 10^{-6}$ | $50 \times 10^{-6}$ |
| 45 | 2800 | $8 \times 10^{-6}$ | $25 \times 10^{-6}$ |
| 90 | 2100 | $5 \times 10^{-6}$ | $18 \times 10^{-6}$ |
| 190 | 1600 | $3 \times 10^{-6}$ | $15 \times 10^{-6}$ |
| 370 | 900 | $3 \times 10^{-6}$ | $15 \times 10^{-6}$ |
| 759 | 300 | $6 \times 10^{-6}$ | $15 \times 10^{-6}$ |
| 1848 | 180 | $9 \times 10^{-6}$ | $15 \times 10^{-6}$ |

Figure 5:
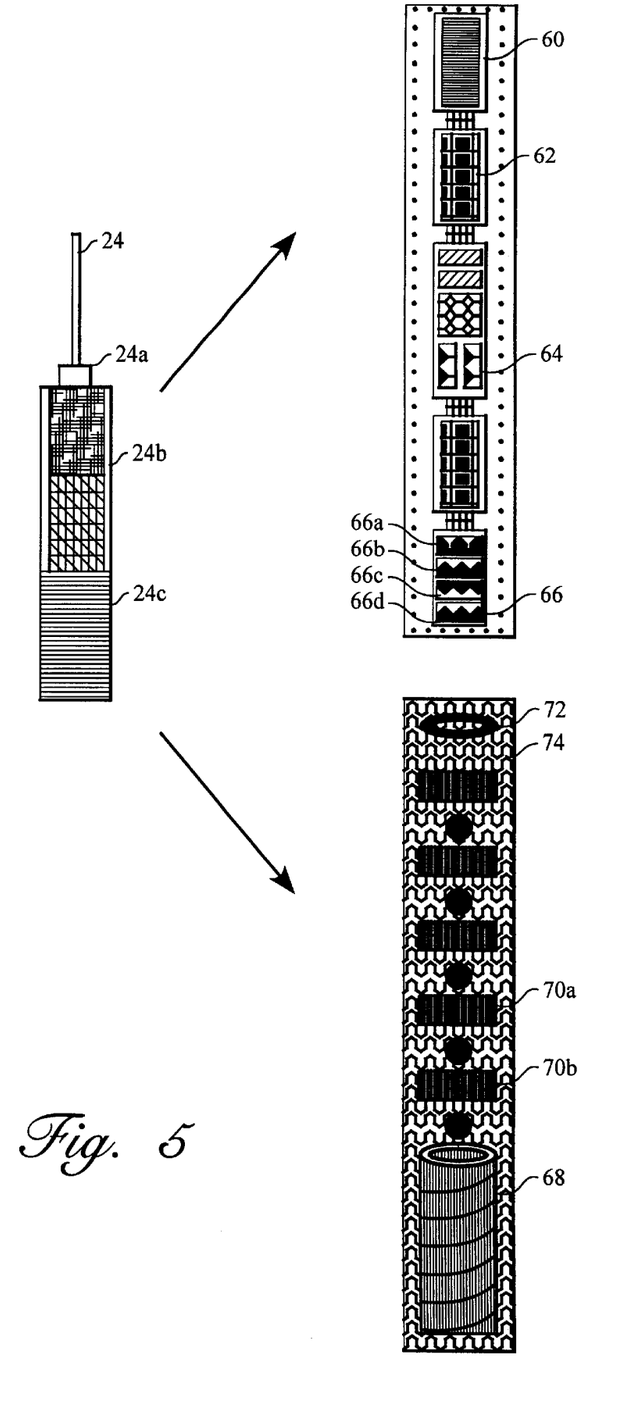
FIG. 5 is a detailed plan view of a receiver shown above in FIG. 3.

Referring to FIG. 5, the receiver 24 includes a tool head 24a, an electronics section 24b and an antenna assembly 24c. The tool head 24a is identical to the tool head 20a, discussed above with respect to FIG. 4. Referring again to FIG. 5, the electronics section 24b in divided into four separate module: a mechanical compensator module 60, power supply module 62, a processing system module 64 and sensors module 66. The mechanical compensator module 60 includes a spring loaded device to supply rigidity to the electronics section that identical to spring loaded device described above with respect to FIG. 4. The power supply module 62 receives power from a surface power supply and regulates and distributes the power to the various components of the receiver 24.

The processing system module 64 is very similar to the circuitry included in module 42c described above with respect to FIG. 4, except that the receiver 24 of FIG. 5 has an integrated dc magnetometer (not shown) and accelerometer (not shown). The magnetometer (not shown) and accelerometer (not shown) allow for the orientation of the magnetic field sensors using the earth's main magnetic field as a reference.

The sensors module 66 includes a series of circuits 66a–66d to condition an analog signal detected by the antenna section 24c. The circuits 66a–66d are a set of computer-controlled amplifiers (not shown) and filters (not shown) to boost signal levels and remove noise from the sensors. The amplifiers (not shown) are designed to optimize the signal-to-noise ratio over the frequency band of interest. The circuits use a secondary coil winding to obtain a flat response over a wide frequency band. This "flat" response, provides excellent phase stability over the band of interest. The sensors module 66 also includes several amplifier gain and filtering options accessed through the software described more fully below.

The antenna section 24c includes several thousand turns of wire around a mu-metal core. The length of the core and number of windings determine the spectral signal and noise characteristics of the coil; receivers optimized for higher frequency applications are smaller with fewer turns than lower frequency receivers. The antenna section 24c has an axial receiver antenna 68 and two transverse antennas 70a and 70b. This combination allows for a complete measurement of the magnetic field vector. The axial receiver antenna 68 has a noise level of up to 10 times below the transverse antennas 70a and 70b due to its greater length. The transverse antennas 70a and 70b are arranged in two orthogonal arrays of twelve coils each with the coils connected in series, as described in U.S. Pat. No. 5,130,655 to Ugo Conti assigned to the assignee of the present invention. Typically, the length of the transverse antennas 70a and 70b are four centimeters. The receiver antenna housing also includes a small auxiliary transmitter 72 spaced-apart approximately 0.5 meter above the axial antenna 68. The auxiliary transmitter 72 monitors the effects of a steel casing pipe surrounding the antenna section 24c and is a similar measurement made by the auxiliary receiver 54, discussed above with respect to FIG. 4. Typical noise levels for the antennas are shown in Table 1.

The antenna section 24c is housed in an outer tube of epoxy composite material (polyimide) 74. This tube is filled with oil and equipped with a pressure driven piston, mounted on the base of the antenna structure, to compensate for the external pressure and can typically withstand 6,000 pounds per square inch of pressure.

Figure 3:
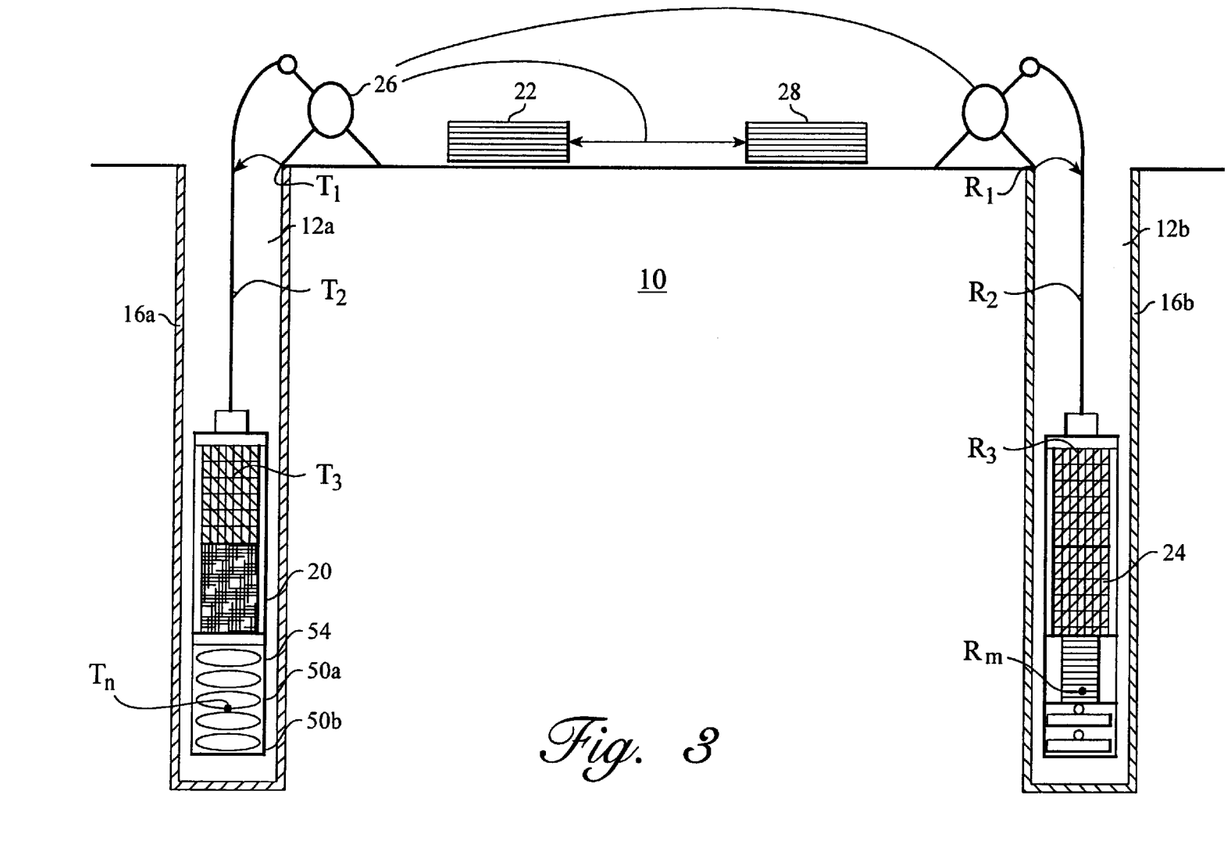
FIG. 3 is a simplified plan view of a cross-well electromagnetic measurement system in accordance with the present invention.

The computer included in surface station 28 may be any commercially available computer but is preferable a lap top computer that includes a four serial communication ports with associated PCMCIA card, a processor having an operational speed of at least 100 Mhz; and at least 32 Mbytes of memory and 2 Gb hard disk. Stored on the hard disk is a layered model inversion code which is usefull for verifying data quality and the accuracy of calibration corrections. software for tool operation, data collection, data reduction, and interpretation. These routines may be written in C++ and FORTRAN in a Win95 environment or any other suitable programming language.

Software routines are written for the processing systems 34 and 64. Exemplary routines include clock synchronization, data initiation, collection and averaging, message passing from the surface station, and control of the relays and switches for frequency selection in the transmitter tool, and amplifier gains and filter setting in receiver coils.

Operational software codes are written for the computer 28 and are designed to initiate data collection, select profile parameters (gains, filters, frequency etc.), display and store data, monitor and display downhole conditions, and read and display depth information. Data reduction software is used once data collection is complete to edit the raw data and remove bad points, apply calibration corrections, and resample to correspond to input criteria for two-dimensional inversion codes. Inversion codes are employed after data collection and reduction is complete. The data set is fit to a two-dimensional model of the inter-well conductivity structure using an inversion code. The system 19, shown in FIG. 3 is also equipped with power line noise rejection filters, to minimize the effects of cultural noise at these busy sites.

The range of this system 19 and the operating procedures are somewhat dependent on the formation resistivity and the presence (or absence) of steel well casing. In general, however, the system has a maximum range of one kilometer in fiberglass cased wells or open holes, and a range of approximately 500 meters if one of the well pairs is steel cased.

Before commencing analysis of geologic formations, it is desired select a frequency band of operation which is typically set by the highest operating frequency under which reliable data may be collected over the entire profile length and by the lowest frequency for which a measurable secondary field is produced. Two simple relations may be used to establish the optimum frequency: the primary field relation and the skin depth equation.

The primary vertical magnetic field is the field present in the absence of a geological formation; it is approximately the largest field that could be expected at the lowest frequency of operation. This is given by the simple expression provided below. This equation is valid when the transmitter 20 and the receiver 24 are positioned at the same vertical level, but it may be used as a rough estimate when vertical levels of the transmitter 20 and the receiver 24 differ by a distance approximately equal to one half the distance of separation between the transmitter 20 and receiver 24, or less. The primary field relation is defined as follows:

$$H_z = \frac{100M}{r^3} \quad (7)$$

where M is the transmitter moment in A-m$^2$, r is the separation between the transmitter 20 and receiver 24 in meters, and H$_z$ is the vertical magnetic field in nano-Teslas (nT).

The highest frequency of operation is determined by the attenuation which is described by the skin depth ($\delta$), defined as the distance through which a plane wave of frequency (f) propagates before attenuation to 1/e of its initial amplitude. It is a measure of how much of the supplied signal is converted to induced currents, producing the secondary fields required for electromagnetic imaging and is defined as follows:

$$\delta(m) \approx 500\sqrt{\frac{\rho}{f}} \quad (8)$$

where $\rho$ is the resistivity of the formation and f the frequency. The receiver noise level at 200 Hz is approximately (from Table 1)

$$\frac{3 \times 10^{-6} nT}{\sqrt{H_z}} \quad (9)$$

From equations (7) and (8), the sensitivity of the system 19, and source moment functions, we can estimate the field level at any cross-hole distance. For example, assuming a separation of 200 meters between boreholes, a formation resistivity of 8 ohm/m, and the transmitter moment is 1000 at 200 Hz and lower, using equation (7), the maximum field at low frequency in the receiver borehole may be determined as 0.0125 nT. This is well above the receiver noise level at 200 Hz.

Preferably, during operation, the transmitter 20 and the receiver 24 are positioned at various vertical levels above, within, and below the area of interest. This effectively increases the distance of separation therebetween to twice the distance of separation between the boreholes. This reduces the magnetic field to 0.002 nT. Equation (8) suggests that, at 200 Hz, the boreholes are two skin depths apart. This increases to four skin depths at the maximum offset of 400 meters. As a result, the magnetic field estimate is reduced by a factor of ten to account for the attenuation by the geologic formation. This provides a minimum field level of 0.0002 nT, which is still above the noise floor.

As a general rule, the operating frequency is chosen by using the skin depth relation defined by equation (8) to select the frequency corresponding to two skin depths between the boreholes. This is shown quantitatively as follows:

$$f=(250{,}000\rho)/(0.5\ R)^2 \quad (10)$$

where R is the separation between boreholes in meters. The signal levels can then be estimated by using equation (7) to calculate the maximum field and dividing this number by 10 to estimate the minimum field. If the minimum field is above the system noise levels given above in Table 1, then the frequency is suitable. If the minimum signal level falls below the noise, we recommend that the frequency be reduced. It is preferred to reduce the frequency than collect incomplete data profiles.

Were one of the boreholes lined with a conductive casing, such as borehole 12a by the presence of conductive liner 16a, calculations should include casing attenuation effects, because, as discussed above, the conductive liners 16a effectively isolates the transmitter 20 from the receiver 24. The present invention, however, overcomes the effects of the conductive liner 16a by recognizing that the effective moment associated with the transmitter 20 is not a function of the formation 10, i.e., the effective moment of the transmitter 20 is a constant, independent of the position of the receiver 24. Therefore, by taling a ratio of a pair of magnetic fields measured at differing positions within the borehole 12b by receiver 24, the casing effects may be eliminated. In this manner, attenuation factors attributable to the casing are reduced, if not canceled, leaving information concerning the conductivity distribution in the formation.

However, the casing still attenuates the field and the resulting fields should be above the noise levels for the receivers (Table 1). Table 2 provides estimates of the signal reduction due to a "typical" conductive liner. To use this table, multiply the expected field by the corresponding coefficient given in the table. Using the example discussed above it is found that the conductive liner attenuation at 190 Hz is 0.005. The minimum expected vertical magnetic field, therefore, can be determined using the equation: Hz=0.0002*0.005=0.00000001=$10^{-8}$ nT. Note, that this value is well below the noise floor listed in Table 1 and the operating frequency would have to be decreased to 90 or 40 Hz in this cased well example.

TABLE 2

| Frequency | Attenuation |
|---|---|
| 1 | 1.0 |
| 5 | .9 |
| 10 | .6 |
| 24 | .3 |
| 45 | .1 |
| 90 | .08 |
| 190 | .005 |
| 370 | .001 |
| 759 | .00001 |
| 1848 | .0000001 |

A specific example illustrates the ratio method of attenuating, if not removing casing effects. Consider that conductive liner 16a was present and borehole 12b was uncased, i.e., conductive liner 16b is not present. The transmitter 20 would first be located at a plurality of positions, $T_i$, in the borehole 12a, with i=1–n, at depths of in×$\Delta_z$ where $\Delta_z$ is the interval between successive positions of the transmitter 20. At each position $T_i$, the receiver 24 would sense the magnetic field within borehole 12b at a series of spaced apart positions $R_j$, with j=1–m, at depths of jm×$\Delta_z$ where $\Delta_z$ is as described above. Thus, the magnetic field measured in borehole 12b, $B_{i,j}$, is a function of the position of the receiver 24 at depths j$\Delta_z$ and the position of the transmitter at depths i$\Delta_z$.

For the reasons discussed above, at any transmitter position, $T_i$, the effective magnetic moment is not accurately known because of unknown variations in the nominal values of the dimensions and properties of the casing 16a. Considering for example that the borehole 12b is uncased, any pair of magnetic fields sensed by the receiver 24, $B_{i,j}$, for a given position of the transmitter 20, $T_i$, may be determined as follows:

$$B_{i,j} = M_i f_{i,j} \quad (11)$$

$$B_{i,j+l} = M_i f_{i,j+l} \quad (12)$$

where Ma is the unknown effective moment of the transmitter 20 and $f_{i,j}$ is the desired formation response (which includes the known geometric factor for that transmitter-receiver geometry). From the foregoing, it is seen that for any given position of the transmitter 20, $T_i$, any pair of magnetic fields sensed by the receiver at differing positions $R_j$, would have the same effective magnetic moment associated therewith. Therefore, by taking the ratio of the two magnetic fields sensed by the receiver 24, a set of measurements are derived which are independent of the magnetic moment that may be employed to interpret the inter hole resistivity as follows:

$$\frac{B_{i,j}}{B_{i,j+l}} = \frac{f_{i,j}}{f_{i,j+l}} \quad (13)$$

To that end, a plurality of magnetic fields $B_{i,j+l}$, are sensed by the receiver at differing positions within the borehole 12b. Each of the plurality of magnetic fields is divided into a common magnetic fields sensed by the receiver, producing a plurality of ratios. It is preferred that each of the plurality of magnetic fields $B_{i,j+l}$, is divided into the first magnetic filed, $B_{i,j}$, sensed by the receiver 24.

After the desired number of magnetic fields $B_{i,j}$ have been sensed by the receiver 24, then the transmitter 20 is moved to the next position $T_{i+l}$ and another set magnetic files $B_{i+l,j}$ are sensed and ratios as described above. This is repeated until the transmitter 20 is moved to position $T_n$, completing a set of cross well ratios. The plurality of ratios defines a data set which is used in an inversion procedure described above for the measured individual fields from each transmitter—receiver pair. In a typical least squares approach as described by *Crosswell electromagnetic inversion using integral and differential equations*, Geophysics, Vol. 60, No. 3, 1995 by Newman, the parameters of the model are varied systematically until the ratios of fields from the numerical simulation match is a least square sense the observed data values. The minor loss of one measurement from the ratio set (there is one less value of the ratios than the total number of measured fields) is inconsequential in the large number of data points used in the inversion process.

This procedure is applicable only if the actual transmitter moment of the solenoidal coil, 20c, is the same for the measurements at the receivers at the plurality of measuring points. In one embodiment of the present invention, this is assured by using a multiplicity of receivers, spaced apart by j$\Delta_z$ which measure the fields simultaneously thus guaranteeing the same moment for each measurement.

An alternate embodiment is to measure accurately the actual current in the transmitter 20 solenoid inside the casing. By dividing all the measured fields by the transmitter current the field are effectively normalized to a transmitter current of one. Specifically, the current in the transmitter 20's solenoid is linearly related to the magnetic moment of the transmitter 20, which, in turn, is linearly related to the induced currents in the casing 16a and hence to the effective moment that is "seen" by the receiver 24. Thus, the magnetic field $B_{i,j}$ sensed by the receiver 24 is thus linearly related to the current in the transmitter 20's solenoid and can be normalized by this current to reduce measurements from the transmitter 24 to what the measurements would have been for a unit current in the same.

Were casing 16b present and casing 16a absent, the procedure described above would work equally as well, because the response for any configuration is unchanged if the transmitter 20 and receiver 24 are interchanged. However, were the receiver 24 to remain at a fixed position in borehole 12b and the transmitter move over a range of positions i, then the ratios of the magnetic fields sensed by the receiver 24 would be taken over the range of i. For this configuration the transmitter moment is not attenuated by a casing, i.e., casing 16a is not present. Therefore, measurements of the magnetic fields need only be normalized by the transmitter 20's current at successive positions thereof, as is done in conventional surveys in uncased drill holes. The complete data set is a collection of values at a series of fixed transmitter 20 receiver 24 separations and frequencies.

Other important survey parameters include the length of the data profiles and the spacing between receiver points. These determine the duration of the field survey as well as the resolution of the images. Ideally, individual data profiles should be twice as long as the borehole separation and the spacing between receiver data points should be about five percent (5%) of the well separation. For example, were the boreholes spaced 200 meters apart, the profiles should be 400 meters long with a receiver 24 spaced every 10 meters in each of the boreholes.

Sometimes the imaging target lies within a restricted depth interval. For example, a particular oil sand undergoing water flooding. In this case tie tomography can be substantially focused on this interval and the profile length reduced. For this case we recommend a profile length equal to the distance between wells and a receiver spacing of five percent (5%) of the borehole spacing in the region of interest, but ten percent (10%) above and below these depths. The resulting image will provide good detail in the region of interest but less above and below.

Additionally, there are often physical restrictions on a survey. For example, imaging boreholes are frequently completed to the depth of the primary hydrocarbon bearing zone. It is useful, however, to extend the measurements to below this interval, but this is not possible if existing wells are utilized. Usually the resolution is somewhat reduced as compared to full coverage data, but often the data are sufficient for resolving large scale structures. In addition, these data are often still quite valuable for process monitoring applications, such as in water or steam floods.

During one mode of operation, the receiver 24 is positioned at various fixed depths in a cased well within the borehole, while the transmitter 20 is pulled up continuously at a constant rate in an uncased well. Therefore, for every position of the receiver 24 there are measurements made at a data a plurality of positions of the transmitter 20, defining a run of data. A plurality of runs of data is taken, with the receiver 24 positions at different depths for each run. In this manner, one complete set of tomography data within the depth range of interest is achieved. Usually, the intervals between different positions of the receiver 24 is about 5% of the distance between the boreholes. It is preferred that the receiver 24 be first moved by twice this interval at a plurality of positions. After the desired region has been measured, the receiver 24 be moved back to acquire the data at points equa-distant from adjacent positions of the aforementioned plurality of positions.

Were both boreholes 12a and 12b, lined with a conductive casing, such as conductive liners shown as 16a and 16b, then a double ratio of the magnetic fields sensed by the receiver 24 should be calculated. To that end, for each ratio, the magnetic field would be sensed at two different positions within borehole 12b at two different positions for the transmitter 20 in borehole 12a. To that end, examples of four magnetic fields sensed by the receiver 24 within borehole 12b are as follows:

$$B_{i,j} = M_i f_{i,j} k_j \tag{14}$$

$$B_{i,j+l} = M_i f_{i,j+l} k_{j+l} \tag{15}$$

$$B_{i+k,j} = M_{i+k} f_{i+k,j} k_j \tag{16}$$

$$B_{i+k,j+l} = M_{i+k} f_{i+k,j+l} k_{j+l} \tag{17}$$

where $M_i$, $M_{i+k}$ is magnetic moment of the transmitter 20 at two different positions in borehole 12a, and $f_{i,j}$, $f_{i,j+l}$ are the formation response at two different positions of the receiver 20 in borehole 12b and at a common position of the transmitter 20 in borehole 12a. The variables $f_{i+k,j}$, $f_{i+k,j+l}$ are the formation response at the same two positions of the receiver 20 in borehole 12b and at a common position of the transmitter 20 in borehole 12a, with the position of the transmitter 20 being different from the position of the transmitter 20 associated with formation response measured represented by $f_{i,j}$, $f_{i,j+l}$. The variables $k_j$, $k_{j+l}$ are the attenuation factor of the casing 16b on the magnetic field sensed by the receiver 24 at two different positions within the borehole 12b. To abrogate the effects of the magnetic moment of the transmitter $M_i$, $M_{i+k}$ ratios of the magnetic fields are determined as follows:

$$r_1 = \frac{B_{i,j}}{B_{i,j+l}} = \frac{f_{i,j}}{f_{i,j+l}} \cdot \frac{k_j}{k_{j+l}}; \tag{18}$$

and $$r_2 = \frac{B_{i+k,j}}{B_{i+k,j+l}} = \frac{f_{i+k,j}}{f_{i+k,j+l}} \cdot \frac{k_j}{k_{j+1}}. \tag{19}$$

To abrogate the effects of the attenuation factor of the casing $k_j$, $k_{j+l}$, the ratio of the two aforementioned ratios are determined as follows:

$$\frac{r_1}{r_2} = \frac{\frac{f_{i,j}}{f_{i,j+l}}}{\frac{f_{i+k,j}}{f_{i+k,j+l}}}. \tag{20}$$

From the foregoing, it is shown that the resistivity of the geologic formation 10 may be determined while minimizing, if not eliminating the effects of the conductive liners 16a and 16b.

Figure 6:
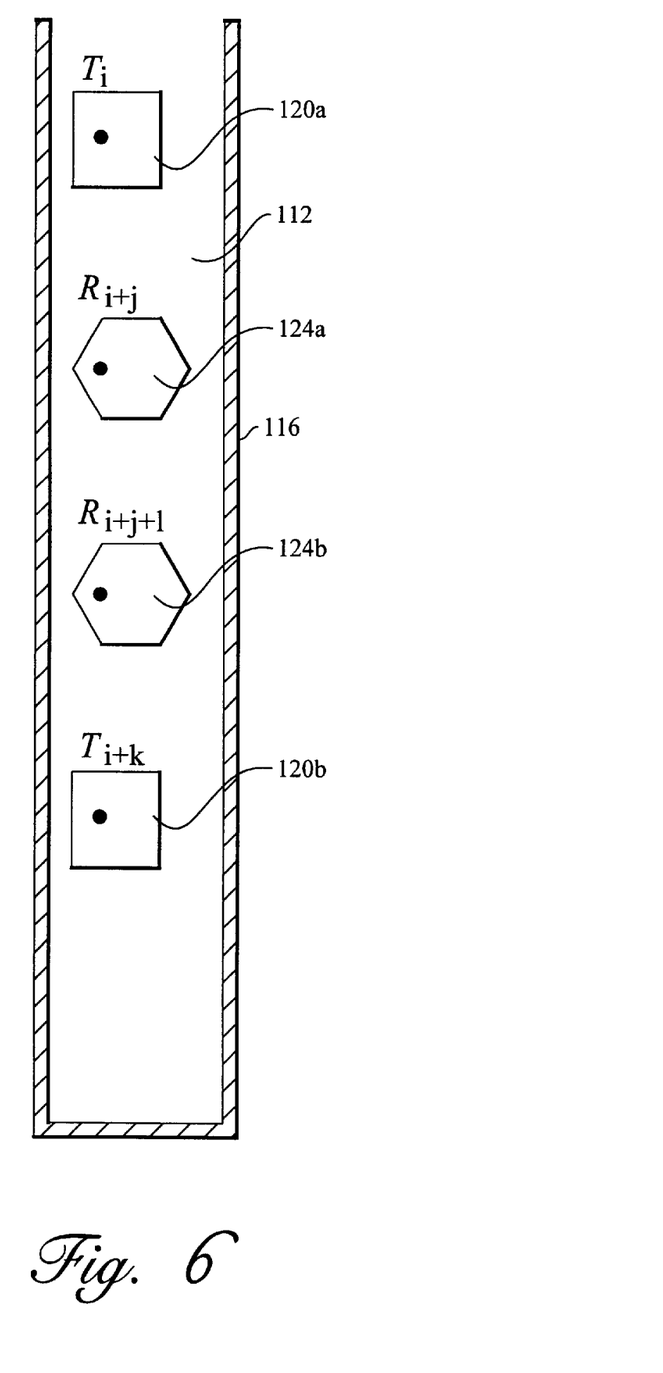
FIG. 6 is a partial simplified plan view of the electromagnetic measurement system in accordance shown above in FIG. 3 showing the transmitter and receiver arrangement for facilitating single hole measurements, in accord with an alternate embodiment of the present invention.

An additional advantage with the present invention is that it facilitates determining the characteristics of a geologic formation using a single borehole 112a having a conductive liner 116 disposed therein, shown in FIG. 6. In one embodiment, a pair of transmitters 120a and 120b are disposed in a common borehole at differing positions, along with a pair of receivers 124a and 124b. The two receiver 124a and 124b are disposed within the borehole 112 at differing positions, but between the two transmitters 120a and 120b. In this fashion, the magnetic field, $B_{i,j}$, measured by receiver 124a at position, $R_j$, from transmitter 120a located at position, $T_j$, is as follows:

$$B_{i,j} = M_i f_{i,j} k_j \tag{21}$$

The magnetic field, $B_{i,j+l}$, measured at receiver 124b at position, $R_{j+l}$, from transmitter 120a at position, $T_j$, is as follows:

$$B_{i,j+l} = M_i f_{i,j+l} k_{j+l} \tag{22}$$

From this, the ratio of measured magnetic fields are determined as follows:

$$R_1 = \frac{B_{i,j}}{B_{i,j+l}} = \frac{f_{i,j} k_j}{f_{i,j+l} k_{j+l}} \tag{23}$$

which is independent of the moment of the transmitter but still depends on the casing attenuation at the receiver. However, employing the second transmitter 120b located at position $T_{i+k}$ a new ratio may be derived from the magnetic field sensed by the receivers 124a and 124b as follows:

$$R_2 = \frac{B_{i+k,j}}{B_{i+k,j+l}} = \frac{f_{i+k,j} k_j}{f_{i+k,j+l} k_{j+l}} \tag{24}$$

It is seen that the ration $R_2$ independent of the moment of the transmitter 120b, but includes information concerning the attenuation factors $k_j$ and $k_{j+l}$ as did ratio $R_1$. Thereafter, the ratio of $R_1$ and $R_2$ are determined as follows:

$$\frac{R_1}{R_2} = \frac{f_{i,j}}{f_{i,j+l}} \cdot \frac{f_{i+k,j+l}}{f_{i+k,j}}. \tag{25}$$

which depends only on the formation factors and is completely independent of casing attenuation factors.

Figure 7:
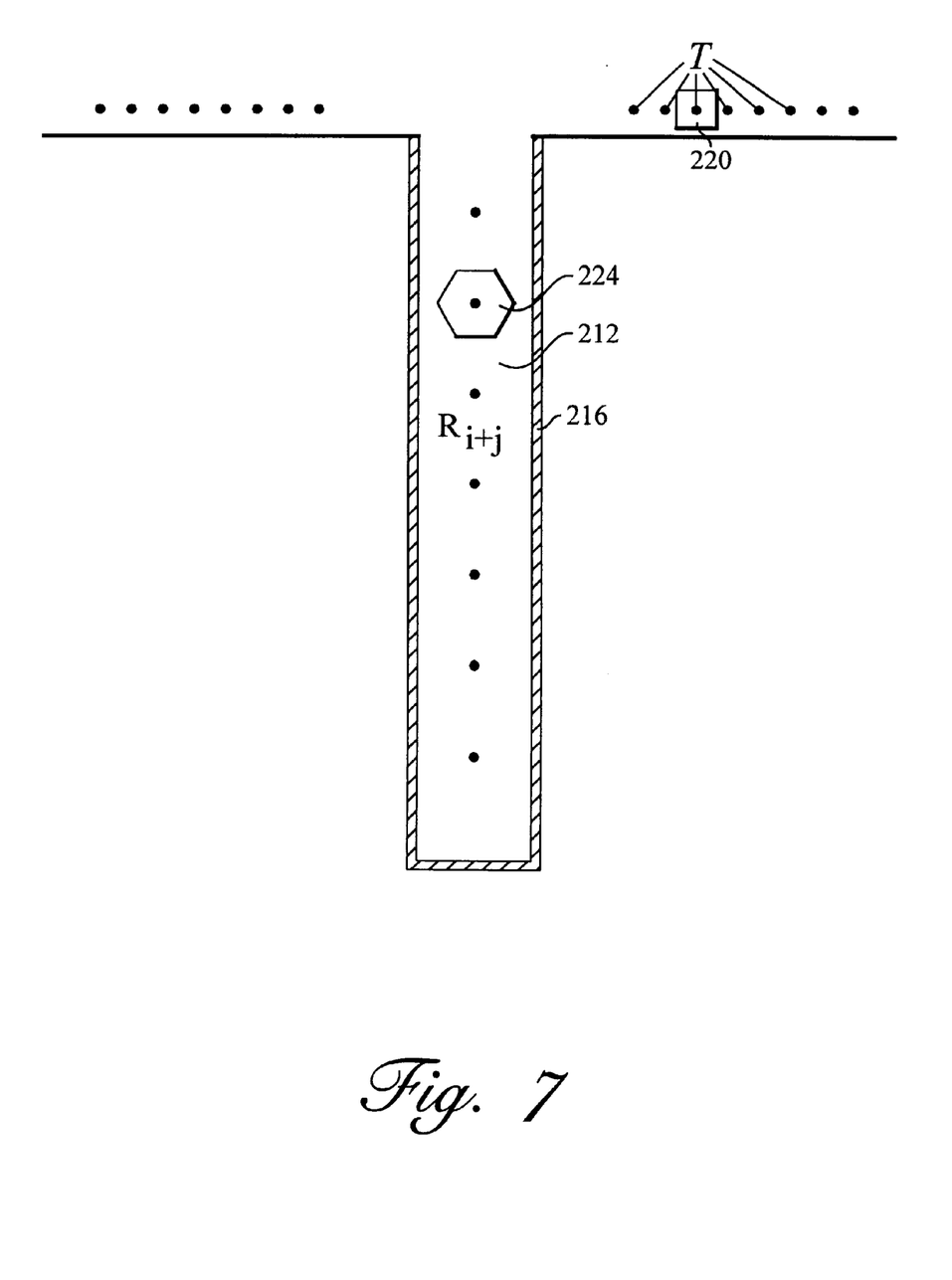
FIG. 7 is a partial simplified plan view of the electromagnetic measurement system in accordance shown above in FIG. 3 showing the transmitter and receiver arrangement for facilitating single hole measurements, in accord with a second alternate embodiment of the present invention.

In another embodiment determining characteristics of a geologic formations using a single borehole 212a having a conductive liner 216 disposed therein, the transmitter 220 may be positioned on the surface of the geologic formation surrounding the borehole 212. One or more receivers 224 are disposed in the borehole 212. In this configuration, the receiver may be positioned at differing positions within the borehole 212, e.g., $R_j$ and $R_{j+l}$. The transmitter 220 is moved to differing positions radially from the axis of the borehole 212. In this manner, the ratio is determined as before for each receiver position and the multiplicity of transmitter positions.

Another advantage with the present invention is that it may be employed for any component in the measured magnetic field. For example, a horizontal transmitter moment (a vertical coil) is attenuated by a complex pattern of induced currents in both the vertical and horizontal directions in the casing. The net effect is to produce an opposing dipole moment so that the field at some distance appears to be that of the original transmitter reduced by a casing factor. Again this casing factor is independent of the formation or of the receiver location. Thus the ratio methods described above may be used with any multicomponent transmitter—receiver configuration.

A further advantage of the present invention concerns the use of orthogonal components of the magnetic field. For example, considering a transmitter with a vertical moment in a cased borehole and a receiver measuring Bz (the vertical component) and Br (the radical or horizontal component) is in an uncased bore, both Bzi and Bri share the same moment. As a result, the ratio of Bzi and Bri:

$$R = \frac{Br}{Bz} \tag{26}$$

is independent of the casing properties at the transmitter. This ratio represents the polarization of the magnetic field and in general it defines an ellipse with a certain ellipticity and tilt angle that characterize the response of the geologic formation, as well as the field quantities themselves.

If the orthogonal receiver pair is in a cased well, a double ratio scheme is required as it is with the previously described above two cased well configuration. The problem is that the casing attenuation factor, k, is different for the horizontal and vertical components. For a given transmitter then the ratio is as follows:

$$R_1 = \frac{Br_{ij}}{Bz_{ij}} \cdot \frac{M_i f_{ri,j} k_{rj}}{M_i f_{zi,j} k_{zj}}. \tag{27}$$

From the foregoing, it is seen that the effective (unknown) moment cancels but the ratio still depends on k. Using another transmitter an additional ratio is determined:

$$R_2 = \frac{Br_{i+k,j}}{Bz_{i+k,j}} \cdot \frac{M_{i+k} f_{ri+k,j} k_{rj}}{M_{i+k} f_{zi+k,j} k_{zj}}. \tag{28}$$

Taking the ratio of the two aforementioned equations, a quantity that is independent of the casing properties surrounding the receiver is determined as follows:

$$\frac{R_1}{R_2} = \frac{fz_{i,j}}{fr_{i,j}} \cdot \frac{fz_{i+k,j}}{fr_{i+k,j}}. \tag{29}$$

The advantage of this scheme is that the polarization parameters can be measured in a single borehole tool rather than using two tools, each containing a receiver, separated by varying amounts. Further, since the two orthogonal fields would be measured simultaneously, there would be no need to accurately monitor the current in the transmitter this approach. The polarization ratio scheme would be particularly effective in the surface to borehole configuration using the orthogonal receivers in the cased borehole. Finally, the single hole configuration, with two transmitters and a single orthogonal pair of receivers would have significant advantages in terms of reduced system complexity and ease of use.

The scope of the invention should, however, be determined not with reference to the above description, but instead should be determined with reference to the appended claims along with their full scope of equivalents.

What is claimed is:

1. A method for determining characteristics of a geologic formation between wellbores, the method comprising:

inducing a first magnetic field at a first position in a first wellbore;

detecting a first formation magnetic field induced by the first magnetic field, at a first position in a second wellbore;

detecting a second formation magnetic field induced by the first magnetic field at a second position, axially spaced apart in the second wellbore from the first position in the second wellbore;

calculating a first amplitude ratio from the first formation magnetic field and the second formation magnetic field; and determining a characteristic of the geologic formation from the first amplitude ratio.

2. The method of claim 1, further comprising:

inducing a second magnetic field at a second position in the first wellbore, axially spaced apart from the first position in the first wellbore;

detecting a third formation magnetic field induced by the second magnetic field, at the second position in the second wellbore;

detecting a fourth formation magnetic field induced by the second magnetic field at a third position, axially spaced apart in the second wellbore from the second position in the second wellbore;

calculating a second amplitude ratio from the third formation magnetic field and the fourth formation magnetic field;

calculating a third amplitude ratio from the first amplitude ratio and the second amplitude ratio; and determining a characteristic of the geologic formation from the third amplitude ratio.

3. The method of claim 2, wherein the first wellbore comprises an electrically conductive casing therein.

4. The method of claim 3, wherein the second wellbore comprises an electrically conductive casing therein.

5. The method of claim 2, wherein a horizontal component of a formation magnetic field is detected.

6. The method of claim 2, wherein the characteristic comprises resistivity of the formation.

7. The method of claim 2, wherein the characteristic comprises conductivity of the formation.

8. The method of claim 2, wherein the characteristic comprises hydrocarbon content of the formation.

9. The method of claim 2, wherein the second wellbore comprises an electrically conductive casing therein.

10. The method of claim 1, wherein the first magnetic field comprises a time varying magnetic field.

11. The method of claim 1, wherein the first magnetic field is induced by a magnetic dipole having an axis substantially parallel to the wellbore axis.

12. The method of claim 1, wherein the first magnetic field is induced by a magnetic dipole having axis substantially perpendicular to the wellbore axis.

13. A method for determining characteristics of a geologic formation between wellbores, the method comprising:

inducing a first magnetic field at a first position in a first wellbore;

detecting a first formation magnetic field induced by the first magnetic field, at a first position in a second wellbore;

inducing a second magnetic field at a second position, axially spaced apart in the first wellbore from the first position in the first wellbore;

detecting a second formation magnetic field induced by the second magnetic field, at the first position in the second wellbore, calculating a first amplitude ratio from the first formation magnetic field and the second formation magnetic field; and determining a characteristic of the geologic formation from the first amplitude ratio.

14. A method for determining characteristics of a geologic formation, the method comprising:

inducing a first magnetic field at a first position in a wellbore;

detecting a first formation magnetic field induced by the first magnetic field, at a second position axially spaced apart in the wellbore from the first position in the wellbore;

detecting a second formation magnetic field induced by the first magnetic field at a third position axially spaced apart in the wellbore from the second position in the wellbore;

calculating a first amplitude ratio from the first formation magnetic field and the second formation magnetic field; and determining a characteristic of the geologic formation from the first amplitude ratio.

15. The method of claim 11, further comprising:

inducing a second magnetic field at a fourth position, axially spaced apart in the wellbore from the first position in the wellbore;

detecting a third formation magnetic field induced by the second magnetic field, at the third position in the wellbore;

detecting a fourth formation magnetic field induced by the second magnetic field at a fifth position, axially spaced apart in the wellbore from the third position in the wellbore;

calculating a second amplitude ratio from the third formation magnetic field and the fourth formation magnetic field;

calculating a third amplitude ratio from the first amplitude ratio and the second amplitude ratio; and determining a characteristic of the geologic formation from the third amplitude ratio.

16. The method of claim 14, wherein the wellbore comprises an electrically conductive casing therein.

17. The method of claim 14, wherein a horizontal component of a formation magnetic field is detected.

18. The method of claim 14, wherein the characteristic comprises resistivity of the formation.

19. The method of claim 14, wherein the characteristic comprises conductivity of the formation.

20. The method of claim 14, wherein the characteristic comprises hydrocarbon content of the formation.

21. The method of claim 13, wherein the first magnetic field comprises a time varying magnetic field.

22. The method of claim 13, wherein the first magnetic field is induced by a magnetic dipole having an axis substantially parallel to the wellbore axis.

23. The method of claim 13, wherein the first magnetic field is induced by a magnetic dipole having axis substantially perpendicular to the wellbore axis.

24. A method for determining characteristics of a geologic formation, the method comprising:

inducing a first magnetic field from a first position proximate the earth's surface above the geologic formation;

detecting a first magnetic formation field induced by the first magnetic field at a first position in a wellbore;

detecting a second formation magnetic field at a second position in the wellbore, axially spaced apart from the first position in the wellbore;

calculating a first amplitude ratio from the first formation magnetic field and the second formation magnetic field; and determining a characteristic of the geologic formation from the first amplitude ratio.

25. The method of claim 24, further comprising:

inducing a second magnetic field from a second position proximate the earth's surface spaced apart from the first position proximate the earth's surface;

detecting a third magnetic formation field at the second position in the wellbore;

detecting a fourth formation magnetic field at a third position in the wellbore, axially spaced apart from the second position in the wellbore;

calculating a second amplitude ratio from the third formation magnetic field and the fourth formation magnetic field;

calculating a third amplitude ratio from the first ratio and the second ratio; and determining a characteristic of the geologic formation from the third amplitude ratio.

26. The method of claim 25, wherein the wellbore comprises an electrically conductive casing therein.

27. The method of claim 25, wherein a horizontal component of a formation magnetic field is detected.

28. The method of claim 25, wherein the characteristic comprises resistivity of the formation.

29. The method of claim 25, wherein the characteristic comprises conductivity of the formation.

30. The method of claim 25, wherein the characteristic comprises hydrocarbon content of the formation.

31. The method of claim 24, wherein the first magnetic field comprises a time varying magnetic field.

32. The method of claim 24, wherein the first magnetic field is induced by a magnetic dipole having an axis substantially parallel to the wellbore axis.

33. The method of claim 24, wherein the first magnetic field is induced by a magnetic dipole having axis substantially perpendicular to the wellbore axis.

* * * * *